US008902705B2

(12) United States Patent
Ozbek et al.

(10) Patent No.: US 8,902,705 B2
(45) Date of Patent: Dec. 2, 2014

(54) REGULARISATION OF IRREGULARLY SAMPLED SEISMIC DATA

(75) Inventors: Ali Ozbek, Cambridgeshire (GB);
Ahmet Kemal Ozdemir, Asker (NO)

(73) Assignee: WesternGeco L.L.C., Houston, TX (US)

( * ) Notice: Subject to any disclaimer, the term of this patent is extended or adjusted under 35 U.S.C. 154(b) by 1275 days.

(21) Appl. No.: 12/518,533

(22) PCT Filed: Oct. 15, 2007

(86) PCT No.: PCT/GB2007/003909
§ 371 (c)(1),
(2), (4) Date: Sep. 9, 2010

(87) PCT Pub. No.: WO2008/074972
PCT Pub. Date: Jun. 26, 2008

(65) Prior Publication Data
US 2010/0329077 A1    Dec. 30, 2010

(30) Foreign Application Priority Data
Dec. 19, 2006    (GB) .................................... 0625239.9

(51) Int. Cl.
*G01V 1/36*    (2006.01)

(52) U.S. Cl.
CPC ...................................... *G01V 1/36* (2013.01)
USPC .......................................................... 367/38

(58) Field of Classification Search
CPC ..................................................... G01V 1/36
USPC ........... 367/38, 40, 43, 46; 375/150; 455/403, 455/562.1
See application file for complete search history.

(56) References Cited

U.S. PATENT DOCUMENTS

| | | | |
|---|---|---|---|
| 3,689,874 A * | 9/1972 | Foster et al. | ..................... 367/46 |
| 4,922,465 A | 5/1990 | Pieprzak et al. | |
| 5,060,202 A | 10/1991 | Meek et al. | |
| 5,444,619 A | 8/1995 | Hoskins et al. | |
| 6,094,620 A | 7/2000 | Gasparotto et al. | |
| 6,502,037 B1 | 12/2002 | Jorgensen et al. | |

(Continued)

FOREIGN PATENT DOCUMENTS

| | | |
|---|---|---|
| GB | 2256048 A | 11/1992 |
| GB | 2282665 A | 4/1995 |

(Continued)

OTHER PUBLICATIONS

Abma et al: "3D interpolation of irregular data with a POCS algorithm", Geophysics, vol. 71, No. 6, 2006, pp. E91-E97.

(Continued)

*Primary Examiner* — Daniel L Murphy

(57) ABSTRACT

There is provided a method of spatially shifting seismic signals acquired through a seismic survey using the steps of identifying within the signals a set of N actual locations of seismic receivers and corresponding N seismic signals received by the set of seismic receivers; identifying a set of N' desired locations of seismic receivers; and determining a set of N' signal values at said N' desired locations by evaluating for each of said N' signal values a weighted sum of the N seismic signals, wherein the weights are at least partly determined by the relative distance between pairs of locations selected from said set of N actual locations of seismic receivers.

11 Claims, 5 Drawing Sheets

(56) References Cited

U.S. PATENT DOCUMENTS

| | | | |
|---|---|---|---|
| 6,522,974 | B2 | 2/2003 | Sitton |
| 6,775,618 | B1 | 8/2004 | Robertsson et al. |
| 7,068,568 | B2 | 6/2006 | Robertsson |
| 7,120,541 | B2 | 10/2006 | Wang |
| 7,715,988 | B2 | 5/2010 | Robertsson et al. |
| 7,835,719 | B1 * | 11/2010 | Francis et al. .............. 455/403 |
| 8,185,316 | B2 | 5/2012 | Alam et al. |
| 2005/0197781 | A1 | 9/2005 | Harmon et al. |
| 2008/0089174 | A1 | 4/2008 | Sollner et al. |
| 2008/0119701 | A1 | 5/2008 | Milner et al. |
| 2010/0211323 | A1 | 8/2010 | Ozdemir et al. |

FOREIGN PATENT DOCUMENTS

| | | |
|---|---|---|
| GB | 2395559 A | 5/2004 |
| GB | 2414299 A | 11/2005 |
| WO | 2005062196 A2 | 7/2005 |
| WO | 2005114258 A1 | 12/2005 |
| WO | 2005062196 A3 | 6/2006 |

OTHER PUBLICATIONS

Butzer et al: "An introduction to sampling analysis", Nonuniform sampling: theory and practice, edited by Farokh Marvasti, Kluwer Academic/Plenum Publishers, New York, 2001, chapter 2, pp. 17-121.

Duijndam et al: "Irregular and sparse sampling in exploration seismology", Nonuniform sampling: theory and practice, edited by Farokh Marvasti, Kluwer Academic/Plenum Publishers, New York, 2001, chapter 11, pp. 479-518.

Etemoglu et al: "Speech coding with an analysis-by-synthesis sinusoidal model", Acoustics, Speech and Signal Processing, vol. 3, 2000, pp. 1371-1374.

Hale: "Resampling irregularly sampled data", Stanford Exploration Project, Sep. 25, 1980, pp. 39-57.

Liu et al: "Reconstruction of seismic data using adaptive regularization", Proceedings of the SPIE, The International Society for Optical Engineering, vol. 4792, 2002, pp. 114-124.

Liu et al: "Minimum weighted norm interpolation of seismic records", Geophysics, vol. 69, No. 6, 2004, pp. 1560-1568.

Mallat et al: "Matching pursuits with time-frequency dictionaries", IEEE Transactions on Signal Processing, vol. 41, No. 12, 1993 pp. 3397-3415.

Robertsson et al: "Rough-sea deghosting using a single streamer and a pressure gradient approximation", Geophysics, vol. 67, No. 6, 2002, pp. 2005-2011.

Xu et al: "Antileakage Fourier transform for seismic data regularization", Geophysics, vol. 70, No. 4, 2005, pp. V87-V95.

Yen: "On nonuniform sampling of bandwidth-limited signals", IRE Transactions on Circuit Theory, CT-3, 1956, pp. 251-257.

Zhang: "Interpolation and Fourier transform of irregularly sampled data", Stanford Exploration Project, Report 72, Dec. 18, 1997, pp. 77-83.

Zwartjes et al: "Fourier reconstruction of non-uniformly sampled, aliased data", SEG International Exposition and 74th Annual Meeting, Denver, Colorado, Oct. 10-15, 2004.

Combined Search and Examination Report of British Application No. GB 0625239.9 dated Apr. 17, 2007.

International Search Report of international application No. PCT/GB2007/003909 dated Mar. 7, 2008.

* cited by examiner

FIG. 4A
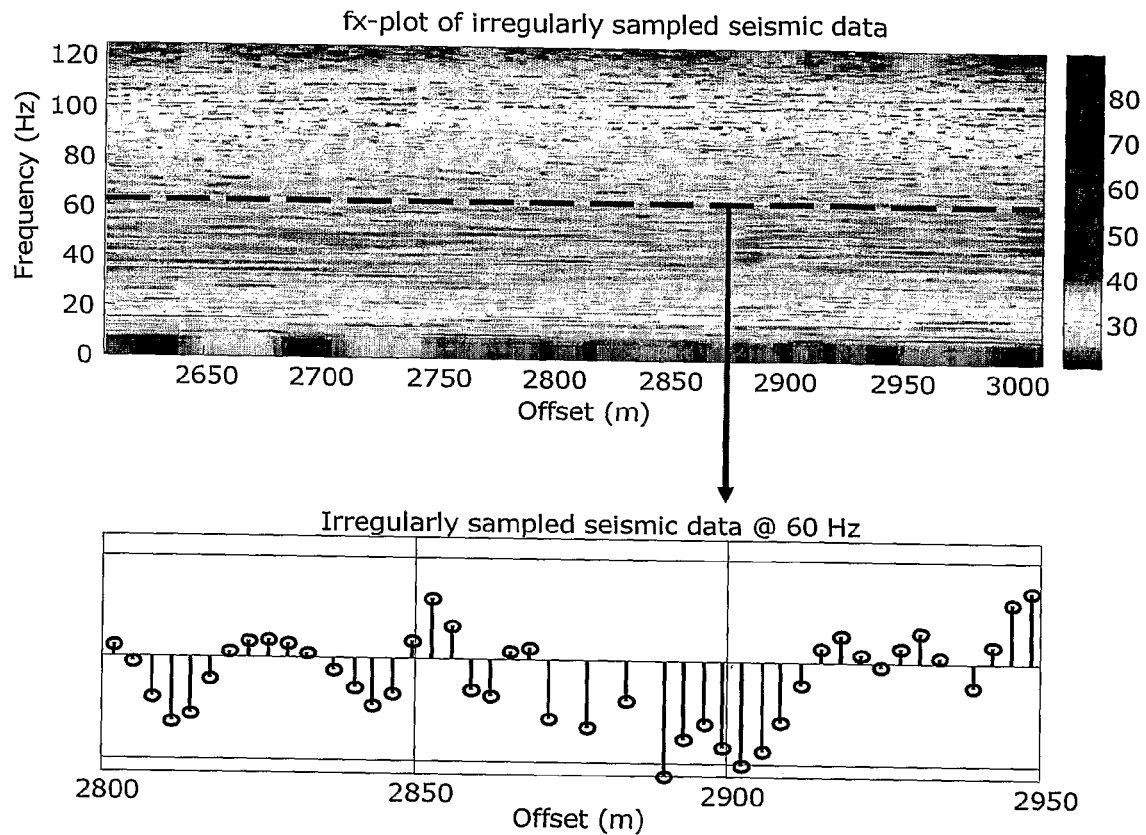
FIG. 4B
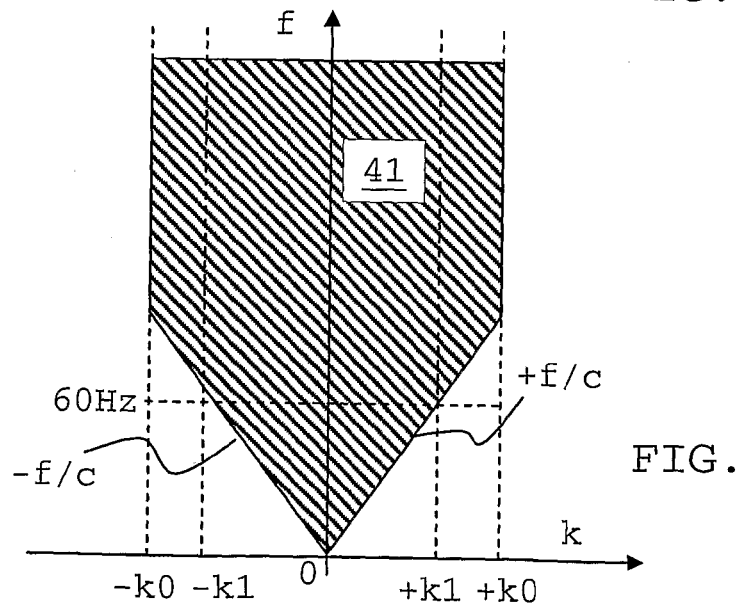
FIG. 4C

REGULARISATION OF IRREGULARLY SAMPLED SEISMIC DATA

The present invention relates to methods for regularizing irregularly sampled seismic data.

BACKGROUND OF THE INVENTION

The aim of exploration seismology is to obtain an image of the subsurface by probing it with seismic waves at various locations. These waves are generally generated by using airguns in marine, and vibroseis or dynamite in land. They propagate downwards through the subsurface, and are reflected at interfaces between geological layers or refracted within layers. Parts of these waves subsequently propagate upwards to the surface, where they are detected and recorded.

In exploration seismology, although the time coordinate is regularly sampled, spatial coordinates are typically irregularly sampled due to the presence of obstacles in land and strong currents in marine. But even for example receivers placed within a marine survey cable or streamer may not be always equidistant. Hence, the inline sampling can be quite irregular.

The regularization of seismic data is very important especially in time-lapse survey matching, multiple suppression and imaging. If the irregular nature of the sampling grid is ignored or handled poorly, notable errors are introduced the severity of which may be further amplified at later stages of the seismic processing chain. The problem of signal reconstruction from uniformly spaced data has been investigated in depth. The Whittaker-Kotel'nikov-Shannon sampling theorem states that any signal f(x) can be reconstructed from its uniformly spaced samples if the sampling interval is less than half the period of the highest frequency component in that signal. Thus if f(x) is bandlimited to the wavenumber s/2, which is known as the Nyquist wavenumber, then the sampling theorem provides the following formula to interpolate any function value from uniformly spaced values f(m/s):

$$f(x) = \sum_{m=-\infty}^{\infty} f(m/\sigma)\mathrm{sinc}(\sigma x - m) \quad [1]$$

where $\mathrm{sinc}(x)=\sin(\pi x)/\pi x$. Thus, when the sampling rate is sufficient and there is no aliasing, the sampling theorem provides a way to reconstruct the signal "exactly" from its uniformly spaced samples. To satisfy requirements of the sampling theorem, the signal should be sampled at a rate greater than twice the Nyquist rate, i.e., s. The seismic signal may be given by:

$$f(x) \approx f_L(x) = \sigma \sum_{m=0}^{L-1} \Delta x_m f(x_m)\mathrm{sinc}(\sigma(x - x_m)) \quad [2]$$

where $\Delta x_m$ is the Jacobian weight, i.e., $\Delta x_m = x_{m+1} - x_m$ and $f(x_m)$ the value of the seismic data at irregular offset $x_m$. It is important to note that, when $\Delta x_m = 1/\sigma$ the sinc interpolator of eq. [2] is exact since $$f(x) = \sum_{m=-\infty}^{\infty} f(m/\sigma)\mathrm{sinc}(\sigma(x - \tau)) \quad [3]$$

by Whittaker-Kotel'nikov-Shannon theorem. On the other hand, when $\Delta x_m$ is not equal $1/\sigma$, the sinc interpolator provides only a crude approximation to the continuous signal.

For such cases, it has been found that a better approach is to invert equation [1] for the desired uniformly spaced signal values $f(m/\sigma)$. This inversion when written in matrix notation yields $$h \equiv \begin{vmatrix} f(x_1) \\ f(x_2) \\ M \\ f(x_L) \end{vmatrix} \approx \begin{vmatrix} s_{11} & s_{11} & \Lambda & s_{1L} \\ s_{21} & s_{11} & \Lambda & s_{2L} \\ M & M & O & M \\ s_{11} & s_{11} & \Lambda & s_{LL} \end{vmatrix} \cdot \begin{vmatrix} f(0) \\ f(1/\sigma) \\ \\ f((L-1)/\sigma) \end{vmatrix} \equiv Sg \quad [4]$$

where $\sigma/2$ is the bandwidth of the signal f(x) and S is the sinc matrix with entries $s_{ij}=\mathrm{sinc}(\sigma(x_i-j/\sigma)$. If the matrix S is well conditioned than the seismic data at regular offsets can be computed by standard matrix inversion:

$$g = S^{-1}h \quad [5]$$

Otherwise, a least squares minimum norm inversion can be used:

$$g = (S^T W_1 S + W_2)^{-1} S^T W_1 h \quad [6]$$

where $W_1$ is usually chosen as a diagonal matrix whose $m^{th}$ diagonal entry is the Jacobian weight $\Delta x_m = x_{m+1} - x_m$ and $W_2$ is usually chosen as a small multiple of identity matrix, i.e., $W_2 = \epsilon^2 I$.

This necessitates the use of robust and efficient techniques for seismic data regularization.

An interpolator in accordance with equation [6] has been described in: Yen J. L., 1956, On nonuniform sampling of bandwidth-limited signals, IRE Trans. Circuit Theory, CT-3, 251-257 (1956). It is therefore sometimes referred to as Yen's Interpolator of Type 1.

Many interpolators used in seismics are variations of the Yen's interpolator for example those described in: Duijndam, A. J. W., Schonewille, M. A., Hindriks, C. O. H., Irregular and sparse sampling in exploration seismology (chapter of L. Zhang: Nonuniform sampling: theory and practice, Kluwer Academic/Plenum Publishers, New York, USA (2001)). The regularization in Duijndam is formulated as a spectral domain problem. There it is proposes to estimate the spectrum of the signal by using non-uniform Fourier transform of the irregular samples, and then reconstruct the regular samples by using inverse discrete Fourier transformation. It can be shown that, this regularization technique is exactly equivalent to Yen's Interpolator of Type 1.

A variant of this method is described in: Zwartjes, P. M. and M. D. Sacchi, 2004, Fourier reconstruction of non-uniformly sampled, aliased data: 74th Ann. Internat. Mtg.: Soc. of Expl. Geophys., 1997-2000. However in Zwartjes there is proposed least squares inversion of the Fourier transformation instead of using an inverse discrete Fourier transform. To this purposes a cost function is defined, which also involves a nonquadratic penalty term to obtain a parsimonious model.

Another example is: Hale, I. D., 1980, Resampling irregularly sampled data, Stanford Exploration Project, SEP-25, 39-58. Hale's method is based on the more general version of the Yen's Interpolator, where a space limited signal assumption is not used. In that case, the uniform samples $f(m/\sigma)$ can still be computed by solving a matrix equation similar to [6]. What Hale suggests is to replace the entries in the inverse matrix by their locally computed approximations.

The interpolators based on Yen's $1^{st}$ theorem usually provide satisfactory results on non-aliased signals with little high-wavenumber content. However their performance degrades significantly when the interpolated signal has a substantial amount of high wavenumber spectral content. Another shortcoming of the interpolators based on Yen's $1^{st}$ theorem is that in order to solve [4], at least as many irregular sampling positions as regular sampling positions are required. Hence, if some seismic traces are dropped out, traces which reside at further locations must be used to solve the system of equations given by [4]. Usually this degrades the accuracy of the interpolated sample values.

Further, although Yen's $1^{st}$ interpolator is exact for infinite length signals, it is an approximation when only a finite extent of the signal is available for interpolation.

Given the problems of the existing interpolators it remains an object to find improved interpolates capable of interpolating data received by receivers at irregular locations to regulars sampling locations.

SUMMARY OF THE INVENTION

In this invention, there is provided a novel technique to regularize the seismic data. The inventive method of spatially shifting seismic signals acquired through a seismic survey includes the steps of identifying within said signals a set of N actual locations of seismic receivers and corresponding N seismic signals received by said set of seismic receivers; identifying a set of N' desired locations of seismic receivers; and determining a set of N' signal values at said N' desired locations by determining for each of said N' signal values a weighted sum of said N seismic signals, wherein the weights are at least partly determined by evaluating a sinc function or any mathematical equivalent of said sinc function using as argument pairs of locations selected from said set of N actual locations of seismic receivers.

The new technique is non-iterative. It accepts a block of input seismic data and provides a block of regularized output seismic data. Since it is linear, it can be represented as a matrix multiplication.

The present invention is based on the recognition that a specific method proposed by: Yen J. L., 1956, On nonuniform sampling of bandwidth-limited signals, IRE Trans. Circuit Theory, CT-3, 251-257 (1956) can have advantageous results over known method proposed for the regularization of seismic data.

Given N=L arbitrary positions of seismic receivers $x_m$ and corresponding signal values $f(x_m)$ the seismic signals can be interpolated to N'=L desired or nominal receiver positions $y_k$ using $$h_L(y_k) = \sum_{m=1}^{L} \sum_{n=1}^{L} \gamma_{mn} f(x_n) \varphi(y_k, x_m) \quad [7]$$

where $\gamma_{mn}$ is the (m,n)-th element of the inverse of a matrix $\Gamma$. The matrix $\Gamma$ has as its (i,j)-th element $\phi(x_i, x_j)$ with $\phi(y,x)=\mathrm{sinc}(\sigma(y-x))$.

Using matrix notation the interpolator of equation [7] can be written compactly as $$h_L = \Phi \Gamma^{-1} g \quad [8]$$

where $\Phi$ is the matrix having (i,j)-th element $\phi(y_i, x_j)$ as its (i,j)-th element.

The entries of the matrix $\Phi$ depend on both irregular and regular receiver positions, the entries of the matrix $\Gamma$ depends only on the irregular receiver positions. Hence, if the separation between consecutive receiver positions varies widely, then the matrix $\Gamma$ will be ill conditioned. In such a case it is preferred to use a regularized inversion of a form such as:

$$h_L = \Phi(\Gamma + W_2)^{-1} g \quad [9]$$

where $W_2$ is chosen as a small multiple of identity matrix, i.e., $W_2 = \epsilon^2 I$.

The interpolator of equations [8] or [9] minimizes the least squares interpolation error in spectral domain. It is also optimal in the min-max sense in that it minimizes the worst-case interpolation error in space domain. Therefore, the application of the new interpolator to seismic data is expected to give superior results over prior art methods.

BRIEF DESCRIPTION OF THE DRAWINGS

The present invention will become more fully understood from the detailed description and the accompanying drawings, wherein:

FIGS. 4A-C illustrate an application of the method in the frequency-space or f,x-domain.

DETAILED DESCRIPTION AND EXAMPLES

In the following description, for the purposes of explanation, the background technologies, a basic example this invention and various preferred embodiments of the basic example are set forth in order to provide a thorough understanding of the invention. However, it will be apparent that the invention may be practiced without these specific details.

Figure 1A:
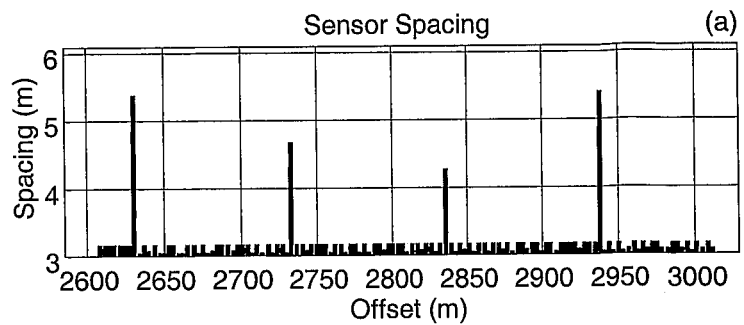
FIG. 1A is a representation of spacing errors in a line of seismic receivers.

FIG. 1A is the graphic illustration of the spacing errors in a line of seismic sensors. These sensors can be for example hydrophones in marine seismic streamer or geophones in a land acquisition set-up. There are shown about 100 receivers with a nominal or desired spacing of close to 3 m. However as the graph shows, the sensors at positions 2630 m, 2732 m, 2835 m and 2937 m, have larger gaps of 5.4 m, 4.7 m, 4.2 m and 5.4 m, respectively. In FIG. 1A, the abscissa denotes the offset of the seismic receiver in meters from a source position and the ordinate denotes the distance to the following sensor in meters.

Figure 1B:
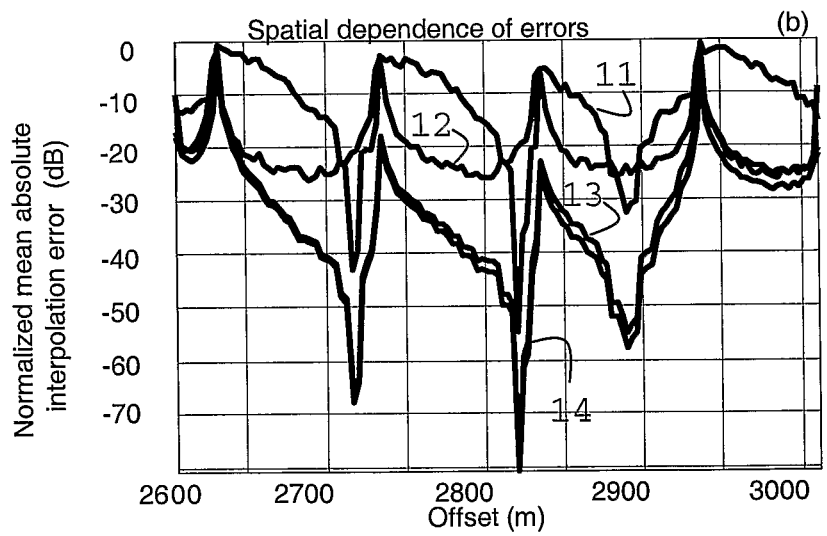
FIGS. 1B and 1C illustrate simulated spatial (FIG. 1B) and spectral (FIG. 1C) errors of four different interpolation methods using non-aliased seismic data.
Figure 1C:
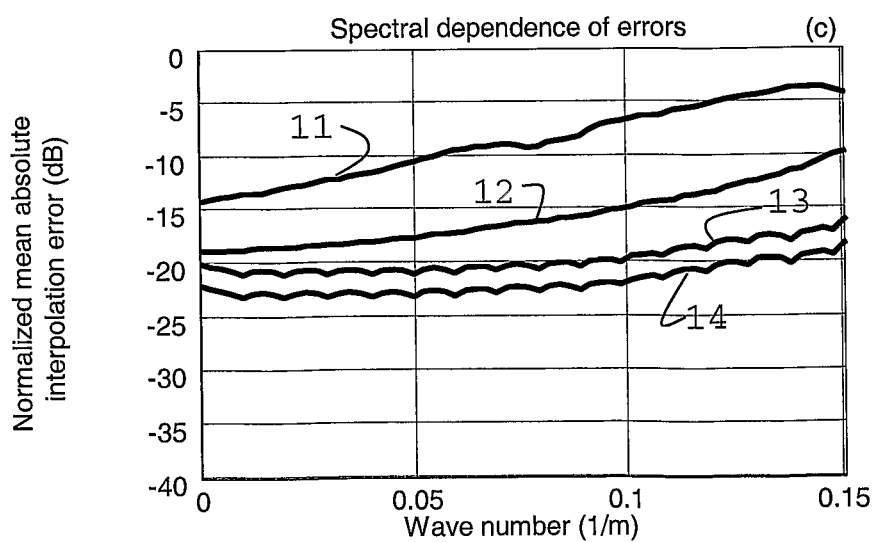

FIGS. 1B and 1C illustrate the simulated spatial and spectral errors, respectively, of four different interpolation methods using seismic data with no spectral content beyond the Nyquist wavenumber, i.e., without aliasing. The interpolation methods are the nearest neighbour method of selecting the nearest measured value as approximation for the interpolated value 11, the sinc method 12 based on equation [2] above, the interpolator of equation [6] 13 and a method in accordance with an example of the invention (equation [9]) 14. As measure for the performance the spatial normalized mean square interpolation error (FIG. 1B) and the spectral normalized mean square interpolation error (FIG. 1C) are shown with the numerals referring to the method used for the interpolation step.

Comparing these results, FIG. 1B shows that the new method provides much lower interpolation error at large gaps and FIG. 1C confirms the poor performance of the nearest neighbor and sinc interpolators. Furthermore, at all wavenumbers, the new method provides superior performance with regard to the spectral interpolation error.

In a further refinement of the example, the process is extended to data which includes dropped signals. In seismic processes, weak or very noisy traces are usually discarded so that these bad traces do not reduce the quality of processing of other traces.

Figure 2A:
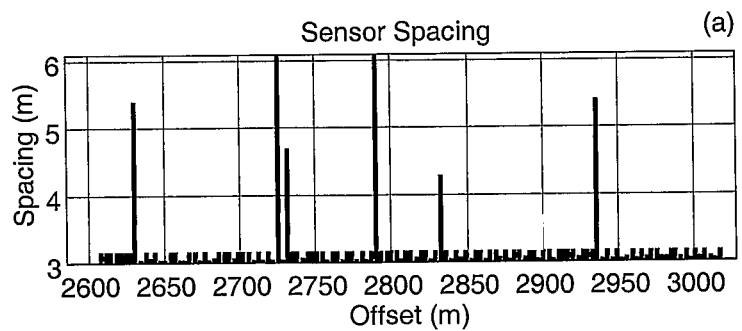
FIG. 2A is a representation of spacing errors and dropped traces in a line of seismic receivers.

To analyze the effect of this dropout, in the second simulation two traces are dropped. In the updated receiver offset-versus-spacing graph of FIG. 2A, deleting two of the traces effectively creates two large gaps of length above 6 m at offsets 2725 m and 2790 m.

Figure 2B:
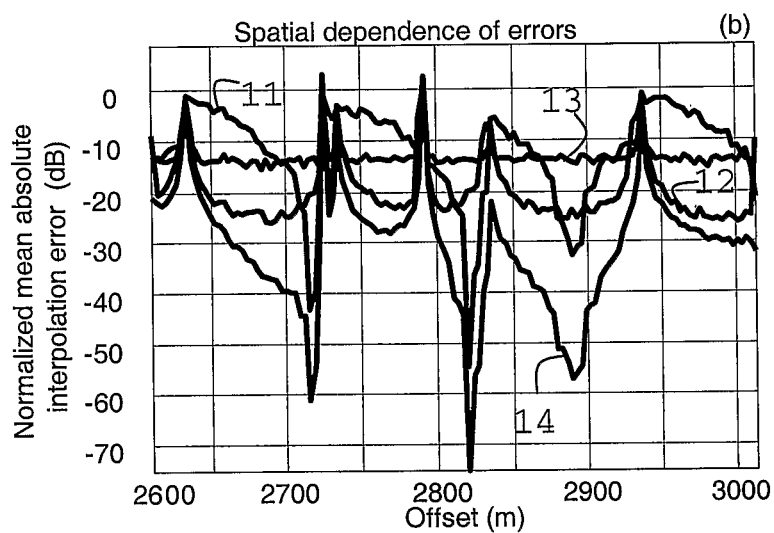
FIGS. 2B and 2C illustrate simulated spatial (FIG. 2B) and spectral (FIG. 2C) errors of four different interpolation methods using non-aliased seismic data.
Figure 2C:
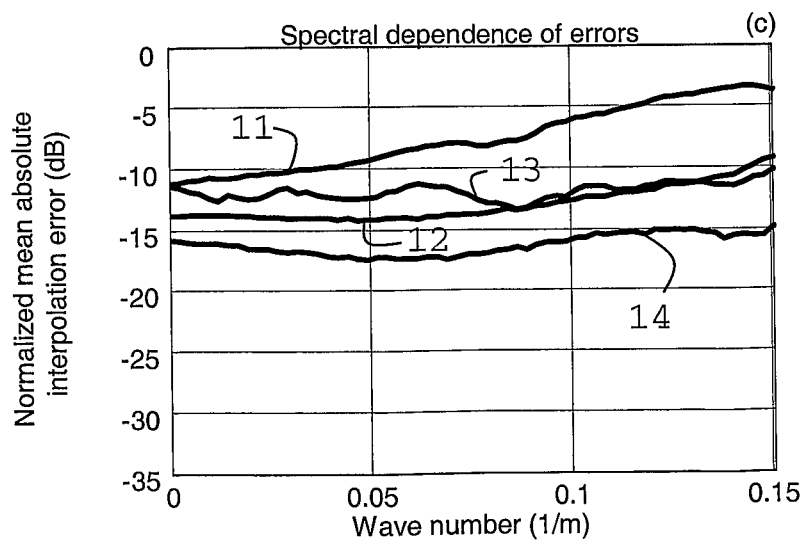

Spatial and spectral mean square interpolation errors given in FIGS. 2B and 2C show that, although the performance of all the methods 11-14 as defined above degrade to some degree, the performance of the newly introduced method 14 is still superior to the other methods 11-13.

Figure 5:
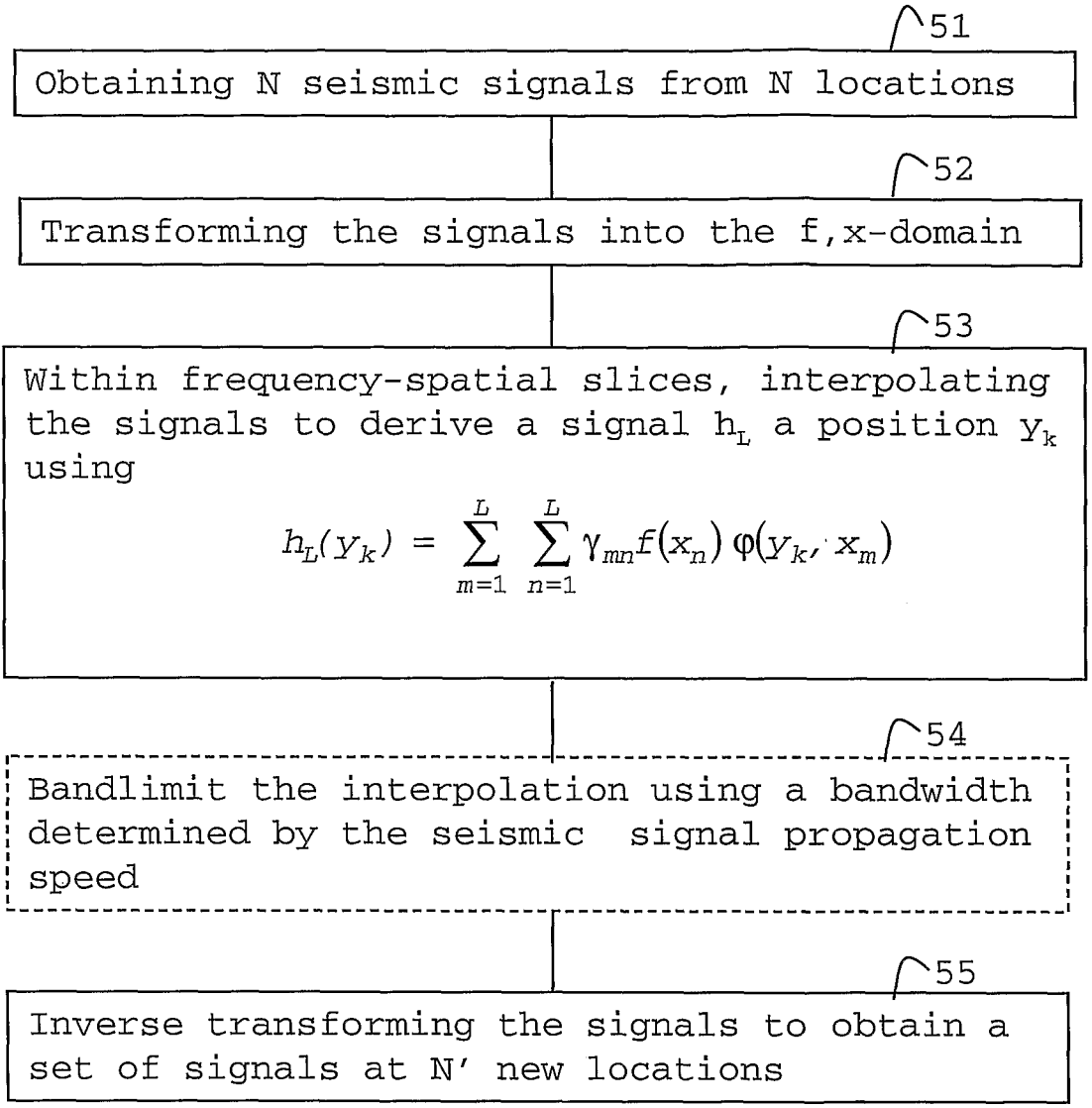
FIG. 5 is a flow chart illustrating steps of an example of invention.

A further example is illustrated in FIGS. 3-5. Data for this example are generated using a seismic model (not shown). The steps are illustrated in the flow chart of FIG. 5

Figure 3A:
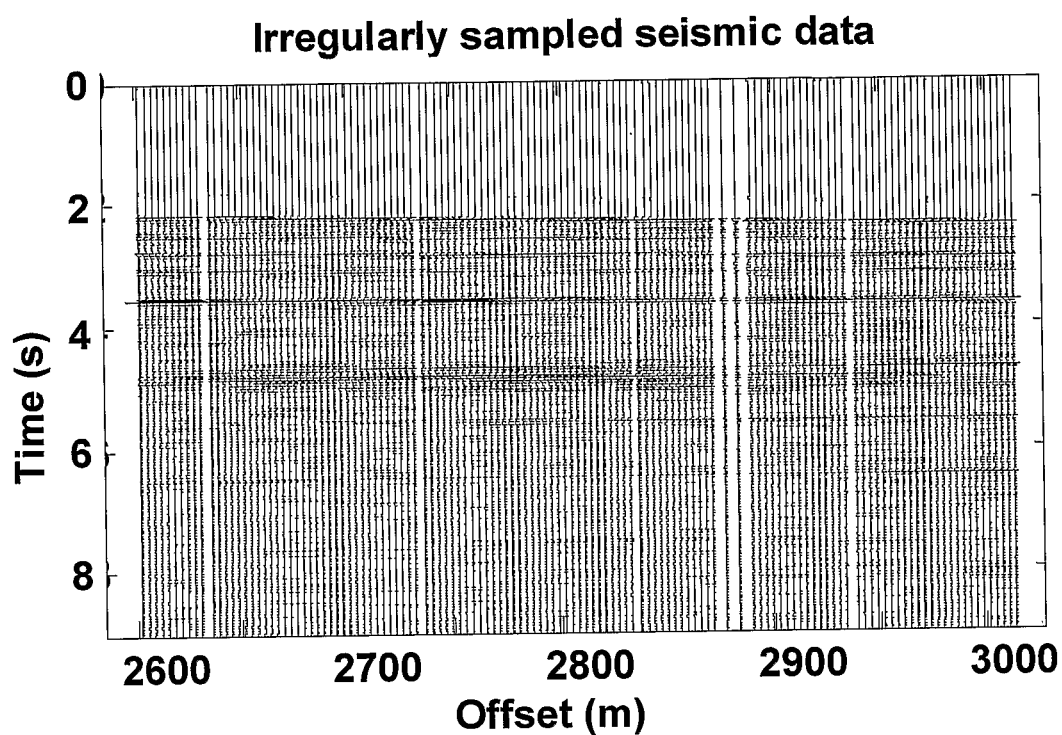
FIGS. 3A and 3B show simulated traces and spacing errors, respectively, of a line of marine seismic sensors.

Initially seismic signals are recording or obtained from a data repository (Step 51 of FIG. 5). In the example, FIG. 3A shows a number of seismic signals or traces as would be recorded by the hydrophones of a seismic marine streamer located between 2600 m and 3000 m offset from a source location. Each hydrophone records for 8 seconds thus generating the traces shown.

Figure 3B:
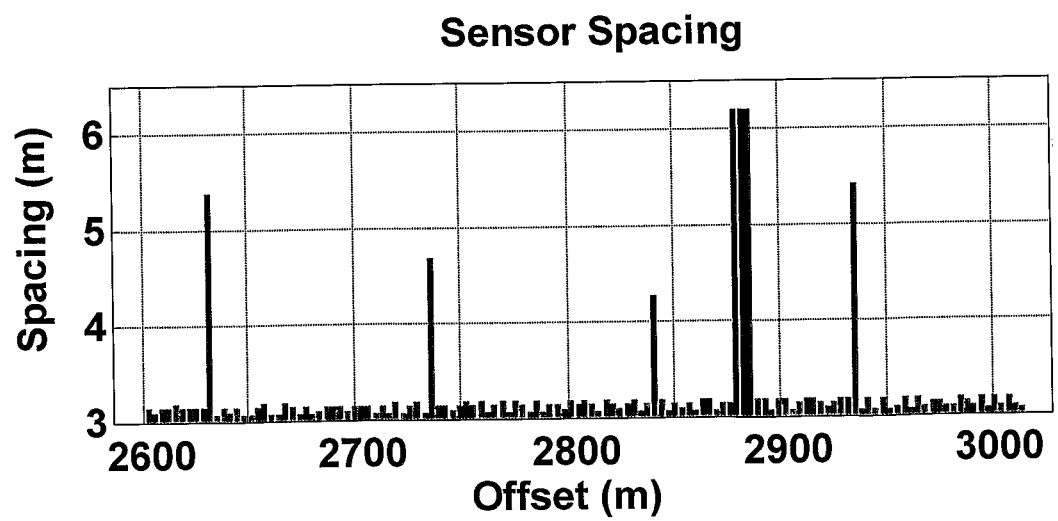

The plot of spacings-versus-offset of FIG. 3B illustrates variations in the hydrophone spacing in the streamer. A three trace dropout close to the offset of 2900 m is visible in both FIGS. 3A and 3B.

Further to this example, the seismic data are transformed (Step 52) into FX domain by computing the Fourier transformation along the time axis resulting in a set of data as shown in FIGS. 4A and 4B. FIG. 4A shows a plot of the data of FIG. 3A transformed into the frequency-space or f,x-domain.

A frequency-spatial slice of the data of FIG. 4A is shown in an enlarged manner in FIG. 4B. The frequency chosen is 60 Hz and the offset range is 2800 m to 2950 m. As the processing method, this and all other f,x-domain slices are regularized independently (Step 53) to obtain a representation of the regularized data in the f,x-domain. By using an inverse Fourier transformation (Step 55), a time, space or t,x-domain representation of the regularized signal is obtained.

To increase the efficiency of the above method, it is beneficial to apply it with different spatial bandwidths for different frequency slice (Step 54). This spatial bandwidth can be regarded as a low-pass filter in the k- or wavenumber-domain. As shown in FIG. 4C the method can be accelerated by using in the example of the slice around 60 Hz a spatial bandwidth limited to +/−k1 rather than the full bandwidth +/−k0. Whilst the latter limit is usually determined by the Nyquist limit or any data decimation applied, the bandwidth +/−k1 is determined by the propagation speed c of the seismic signal and varies with frequency between 0 and +/−k0 according to the relationship f/c as shown. The signals with relevance to the seismic data processing are confined within the hatched area 41. For marine seismic signals the speed c can be taken to be close to 1500 m/s. The speed c varies depending on environmental conditions (temperature, salt content, etc.) For land and transition zone acquisitions, an even larger variation in c can be found. In embodiments of the present invention, the seismic data being used for interpolation is processed to provide that signals are limited to a frequency content between 0 and 500 Hz.

The invention claimed is:

1. A method of spatially shifting seismic signals acquired through a seismic survey comprising the steps of:
receiving the seismic signals, wherein the seismic signals are recorded by a plurality of seismic receivers arranged in an irregularly spaced grid pattern, and wherein the seismic signals comprise seismic waves that have interacted with geological layers in a subsurface of the Earth;
identifying within said seismic signals a set of N actual locations of a set of the seismic receivers and corresponding N seismic signals received by said set of seismic receivers;
identifying a set of N' desired locations of the seismic receivers;
interpolating a set of N' signal values at said N' desired locations by determining for each of said N' signal values a weighted sum of said N seismic signals, wherein the weights are at least partly determined by evaluating a sinc function or any mathematical equivalent of said sinc function and wherein pairs of actual locations of the receivers from the set of N actual locations of the set of seismic receivers are used to evaluate the sinc function or any mathematical equivalent of said sinc function; and
using the set of N' signal values to derive a representation of at least a part of a subterranean reservoir.

2. A method of claim 1, wherein the pairs of actual locations of the receivers include pairs of locations that are not nearest neighbors.

3. A method of claim 1 wherein the weights are further at least partly determined using a relative distance between pairs formed by taking one of the N' locations and selecting one actual location from the set of N actual locations of seismic receivers.

4. A method of claim 1 wherein the weights are further at least partly determined by evaluating the sinc function or any mathematical equivalent of said sinc function using as argument pairs formed by taking one of the N' locations and one of the set of N actual locations of seismic receivers.

5. A method of claim 1 wherein the weights are at least partly determined by evaluating an inverse of a matrix of elements $\phi(x_i, x_j)$ with $\phi(y,x)=\text{sinc}(\sigma(y-x))$, and wherein $x_i$ and $x_j$ are actual receiver locations selected from the N actual locations and $\phi$ represents a desired spacing between receivers or an inverse thereof, or any mathematically equivalent representation of said inverse.

6. A method of claim 5 wherein the N' signal values are determined using:

$$h_L(y_k) = \sum_{m=1}^{L} \sum_{n=1}^{L} \gamma_{mn} f(x_n) \varphi(y_k, x_m)$$

wherein $y_k$ denotes a desired location and $\gamma_{mn}$ is the inverse of a matrix of elements $\phi(x_i, x_j)$ with $\phi(y,x)=\text{sinc}(\sigma(y-x))$ or any mathematically equivalent representation of said sum.

7. The method of claim 1 wherein the highest frequency of the N seismic signals is below 500 Hz.

8. The method of claim 1 wherein the N seismic signals are limited to a frequency content between 0 and 500 Hz.

9. The method of claim 1 wherein the N seismic signals are split and regularized in frequency bands.

10. The method of claim 9 wherein the N seismic signals are split and regularized in frequency bands and the step of determining said set of N' signal values at said N' desired locations is performed using different spatial bandwidths in different frequency bands.

11. The method of claim 10 wherein the different spatial bandwidths are determined by a speed of propagation of the seismic signals.

* * * * *